(12) United States Patent
Leuchtenberg et al.

(10) Patent No.: US 10,316,607 B2
(45) Date of Patent: Jun. 11, 2019

(54) PRESSURE CONTAINMENT DEVICES (71) Applicant: MANAGED PRESSURE OPERATIONS PTE. LTD., Singapore (SG)

(72) Inventors: Christian Leuchtenberg, Singapore (SG); Alexander John MacGregor, Scotland (GB); George Michaud, N W Calgary (CA); Saravanan Sundaramoorthy, Tamilnadu (IN)

(73) Assignee: MANAGED PRESSURE OPERATIONS PTE. LTD., Singapore (SG)

( * ) Notice: Subject to any disclaimer, the term of this patent is extended or adjusted under 35 U.S.C. 154(b) by 44 days.

(21) Appl. No.: 15/536,658

(22) PCT Filed: Nov. 17, 2015

(86) PCT No.: PCT/GB2015/053478
§ 371 (c)(1),
(2) Date: Jun. 16, 2017

(87) PCT Pub. No.: WO2016/097677
PCT Pub. Date: Jun. 23, 2016

(65) Prior Publication Data
US 2017/0370171 A1 Dec. 28, 2017

(30) Foreign Application Priority Data
Dec. 17, 2014 (GB) .................................. 1422522.1

(51) Int. Cl.
*E21B 33/06* (2006.01)
*F16J 15/46* (2006.01)

(52) U.S. Cl.
CPC ............... *E21B 33/06* (2013.01); *F16J 15/46* (2013.01)

(58) Field of Classification Search
CPC .................................. F16J 15/46; E21B 33/06
See application file for complete search history.

(56) References Cited

U.S. PATENT DOCUMENTS

| 1,861,726 A | 6/1932 | Trout |
| 1,930,361 A | 10/1933 | Kilmer, Jr. |
| 2,155,837 A | 4/1939 | Penick et al. |
| 2,609,836 A | 9/1952 | Knox |

(Continued)

FOREIGN PATENT DOCUMENTS

| EP | 1 061 231 A1 | 12/2000 |
| EP | 1 659 260 A2 | 5/2006 |

(Continued)

*Primary Examiner* — Gilbert Y Lee
(74) *Attorney, Agent, or Firm* — Norman B. Thot (57) ABSTRACT

A pressure containment device includes a sealing element. The sealing element includes a longitudinal axis, a substantially annular cross-section arranged perpendicular to the longitudinal axis, a radially inwardly facing interior surface having a plurality of recesses, a radially outwardly facing exterior surface, a first end surface having a plurality of recesses, and a second end surface. The first end surface and the second end surface are each arranged to extend from the radially inwardly facing interior surface to the radially outwardly facing exterior surface. The first end surface and the second end surface are arranged at opposite ends of the sealing element.

14 Claims, 8 Drawing Sheets

(56) References Cited

U.S. PATENT DOCUMENTS

| | | | |
|---|---|---|---|
| 3,044,481 A | 7/1962 | Regan | |
| 3,128,077 A | 4/1964 | Lucky | |
| 3,299,957 A | 1/1967 | O'Neill et al. | |
| 3,572,628 A | 3/1971 | Jones | |
| 3,667,721 A | 6/1972 | Vujasinovic | |
| 4,098,341 A | 7/1978 | Lewis | |
| 4,098,516 A | 7/1978 | Murman | |
| 4,317,557 A | 3/1982 | Orr | |
| 4,447,037 A | 5/1984 | Huey et al. | |
| 4,461,448 A | 7/1984 | Huey et al. | |
| 4,614,148 A | 9/1986 | Bates | |
| 4,949,785 A * | 8/1990 | Beard | E21B 33/06 166/196 |
| 5,116,017 A * | 5/1992 | Granger | E21B 33/06 251/1.2 |
| 5,662,171 A | 9/1997 | Brugman et al. | |
| 8,176,933 B2 * | 5/2012 | Huff | B29C 35/0222 137/315.02 |
| 8,800,648 B2 | 8/2014 | Kocurek et al. | |
| 2006/0108119 A1 | 5/2006 | Bailey et al. | |
| 2008/0023917 A1 * | 1/2008 | Khandoker | B29C 35/0222 277/324 |
| 2010/0147536 A1 * | 6/2010 | Trevas | E21B 33/06 166/387 |
| 2012/0261888 A1 * | 10/2012 | Borden | E21B 33/085 277/562 |
| 2013/0043657 A1 | 2/2013 | Carringer | |
| 2013/0168578 A1 | 7/2013 | Leuchtenberg et al. | |
| 2013/0341538 A1 * | 12/2013 | Huang | E21B 33/06 251/1.1 |
| 2014/0203516 A1 | 7/2014 | Kocurek et al. | |

FOREIGN PATENT DOCUMENTS

| | | |
|---|---|---|
| GB | 1 266 556 A | 3/1972 |
| GB | 2 100 775 A | 1/1983 |
| WO | WO 2011/128690 A1 | 10/2011 |

* cited by examiner

PRESSURE CONTAINMENT DEVICES

CROSS REFERENCE TO PRIOR APPLICATIONS

This application is a U.S. National Phase application under 35 U.S.C. § 371 of International Application No. PCT/GB2015/053478, filed on Nov. 17, 2015 and which claims benefit to Great Britain Patent Application No. 1422522.1, filed on Dec. 17, 2014. The International application was published in English on Jun. 23, 2016 as WO 2016/097677 A1 under PCT Article 21(2).

FIELD

The present invention relates to a pressure containment device, particularly but not exclusively, an annular blowout preventer for use in the drilling of a wellbore into a subterranean fluid reservoir and/or the production of fluid, typically hydrocarbon fluids, from such a reservoir.

BACKGROUND

The drilling of a borehole or well is typically carried out using a steel pipe known as a drill pipe or drill string with a drill bit on the lowermost end. The drill string comprises a series of tubular sections, which are connected end to end. The entire drill string is typically rotated using a rotary table or top drive mounted on top of the drill pipe, and as drilling progresses, a flow of mud is used to carry the debris and/or cuttings created by the drilling process out of the wellbore. Mud is pumped down the drill string to pass through the drill bit, and returns to the surface via the annular space between the outer diameter of the drill string and the wellbore (generally referred to as the annulus). For a subsea well bore, a tubular, known as a riser, extends from the rig to the top of the wellbore and provides a continuous pathway for the drill string and the fluids emanating from the well bore. In effect, the riser extends the wellbore from the sea bed to the rig, and the annulus also comprises the annular space between the outer diameter of the drill string and the riser.

The use of a blowout preventer (BOP) to seal, control and monitor oil and gas wells is well known, and these are used on both land and off-shore rigs. During drilling of a typical high-pressure wellbore, the drill string is routed through a BOP stack toward a reservoir of oil and/or gas. The BOP is operable, in the event of a sudden influx of formation fluid into the wellbore (a kick) to seal around the drill string, thus closing the annulus and stopping tools and formation fluid from being blown out of the wellbore (a blowout). The BOP stack may also be operable to sever the drill string to close the wellbore completely. Two types of BOP are in common use, ram and annular, and a BOP stack typically includes at least one of each type. The original design of an annular BOP is described in U.S. Pat. No. 2,609,836.

A typical BOP has a sealing element and a fluid pressure operated actuator mounted in a housing. The actuator divides the interior of the housing into two chambers (an "open chamber" and a "close chamber"), and substantially prevents flow of fluid between the two chambers. The actuator is movable, by means of the supply of pressurized fluid to the close chamber, to urge the sealing element into sealing engagement with a drill pipe extending through the BOP (the closed position), and, by means of the supply of pressurized fluid to the open chamber, to release the sealing element from sealing engagement with the drill pipe (the open position). Certain types of BOP are configured such that, when there is no drill pipe in the BOP, the sealing element can close on itself to close completely the BOP stack, and thus also the wellbore.

The supply of pressurized fluid for actuation of the BOP typically comprises a pump which is operable to pump fluid into an accumulator via a line containing a non-return valve. Fluid flow lines are provided to connect the accumulator to the open chamber and the close chamber and at least one valve is provided to control flow of fluid from the accumulator to the open or close chamber.

An example of a typical annular BOP and fluid pressure control system is described in U.S. Pat. No. 4,098,341. Alternative embodiments of a BOP and their control systems are described in U.S. Pat. Nos. 3,044,481, 3,299,957 , 4,614,148, 4,317,557 and 3,128,077.

Various configurations of seals suitable for use in mineral extraction systems are also described in U.S. Pat. No. 8,800,648, US 2013/0043657 and US 2014/0203516.

Figure 1A:
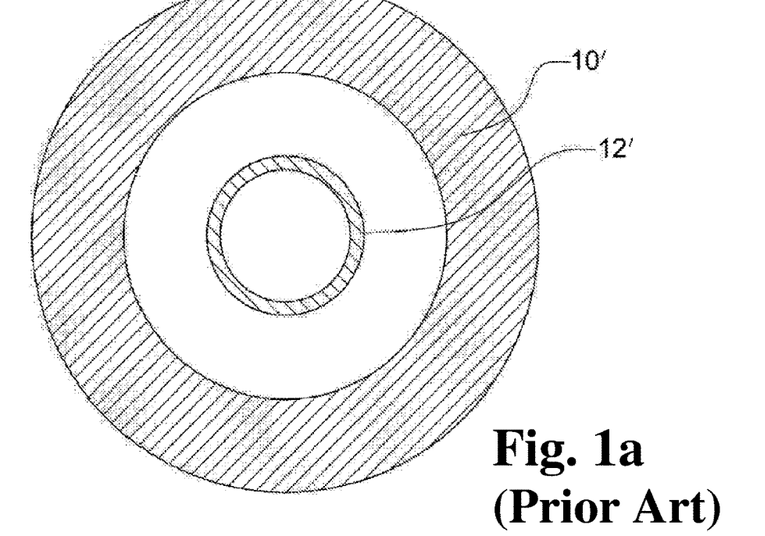
Figure 1B:
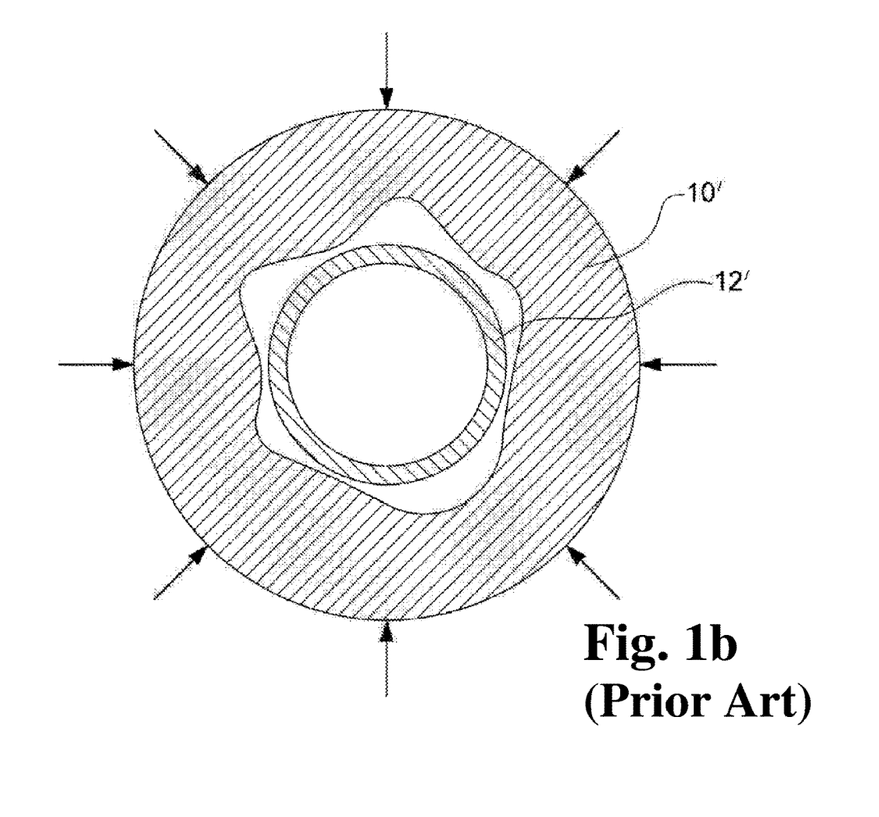

FIG. 1 is a schematic illustration of a transverse cross-section through a conventional, prior art, elastomeric sealing element 10' of the type used in conventional, prior art, blowout preventers a) in a relaxed state and b) in a compressed state. When in the relaxed state, the elastomeric sealing element 10' has a generally annular transverse cross-section. When the blowout preventer is closed, the elastomeric sealing element 10' is compressed so as to reduce the diameter of the space it encloses. To do this, radially inwardly directed forces are applied to the elastomeric sealing element 10', either directly or by virtue of the elastomeric sealing element 10' being pushed against the BOP housing by a piston which is movable generally parallel to the longitudinal axis of the BOP.

The resulting deformation/folding pattern on the elastomeric material will be based on the least resistance region of the elastomeric sealing element 10' and will depend on either the buckling modes of the elastomeric ring or the defects/weak regions of the elastomer. As a consequence, there is no control over the folding pattern at the inner surface of the elastomeric sealing element 10' which will create irregular folds as shown in FIG. 1b. Irregular folds creates high strains in certain folds and low strains in other folds, and the highly strained regions of the elastomeric material will have a tendency for faster crack growth/lesser life due to the availability of high strain energy density on the critical folding regions. Moreover, the sealing surface generated between the elastomeric sealing element 10' and a tubular drill string 12' extending through the BOP will be perfect in some regions and not in other regions where the elastomeric sealing element 10' is still spaced from the tubular string. This variation in the sealing surface means that a very high compressive force is required to seal completely around the tubular string.

SUMMARY

An aspect of the present invention is to provide an improved pressure containment device which reduce the above problems.

In an embodiment, the present invention provides a pressure containment device which includes a sealing element. The sealing element includes a longitudinal axis, a substantially annular cross-section arranged perpendicular to the longitudinal axis, a radially inwardly facing interior surface comprising a plurality of recesses, a radially outwardly facing exterior surface, a first end surface comprising a plurality of recesses, and a second end surface. The first end surface and the second end surface are each arranged to extend from the radially inwardly facing interior surface to the radially outwardly facing exterior surface. The first end surface and the second end surface are arranged at opposite ends of the sealing element.

BRIEF DESCRIPTION OF THE DRAWINGS

The present invention is described in greater detail below on the basis of embodiments and of the drawings in which:

FIG. 1 is a schematic illustration of a transverse cross-section through a conventional, prior art, elastomeric sealing element 10' of the type used in conventional, prior art, blowout preventers a) in a relaxed state and b) in a compressed state;

FIG. 7 is a schematic illustration of a transverse cross-section through the sealing element illustrated in FIGS. 5 and 6 a) in a relaxed state and b) in a compressed state;

DETAILED DESCRIPTION

The present invention provides a pressure containment device comprising a sealing element having a longitudinal axis and a cross-section perpendicular to its longitudinal axis which is generally annular, the sealing element thus having a radially inwardly facing interior surface, a radially outwardly facing exterior surface, and a first end surface and a second end surface which extend from the interior surface to the exterior surface, wherein both the interior surface and the first end surface are provided with a plurality of discrete recesses.

The recesses provided in the interior surface form a first set of recesses in which the recesses are spaced around the circumference of the interior surface. In one embodiment, the recesses in the first set can, for example, be located exclusively in the interior surface between the first end surface and the second end surface. In this case, the recesses in the first set may be located generally centrally between the first end surface and the second end surface. In one embodiment, the recesses in the first set can, for example, be regularly spaced around the circumference of the interior surface.

The recesses provided in the end surface form a second set of recesses in which the recesses are spaced in a generally circular array. In one embodiment, the recesses in the second set can, for example, be regularly spaced in a generally circular array.

In one embodiment, a center of each of the recesses can, for example, be located on an imaginary plane in which the longitudinal axis of the sealing element also lies, and the imaginary plane associated with each recess in the second set is located directly between two of the imaginary planes associated with recesses of the first set. In one embodiment, the imaginary plane associated with each recess in the first set can, for example, be located directly between two of the imaginary planes associated with the recesses of the second set.

The imaginary plane associated with each recess in the second set may be located centrally between two of the imaginary planes associated with recesses of the first set.

The imaginary plane associated with each recess in the first set may be located centrally between two of the imaginary planes associated with the recesses of the second set.

In one embodiment, the angle between adjacent imaginary planes can, for example, be substantially equal for all pairs of adjacent imaginary planes.

The pressure containment device may further comprise an actuator assembly which is operable to engage with the sealing element to reduce the diameter of the space enclosed by the interior surface.

The pressure containment device may further include a housing, the actuator assembly being operable to push the sealing element against the housing to reduce the diameter of the space enclosed by the interior surface.

The actuator assembly may comprise a piston movable by the supply of pressurized fluid to the pressure containment device. In one embodiment, the piston can, for example, be movable generally parallel to a longitudinal axis of the pressure containment device by the supply of pressurized fluid to the pressure containment device.

The sealing element may be made predominantly from an elastomer.

The sealing element may include a plurality of rigid inserts. In this case, the inserts may be metallic. The inserts may be spaced from one another and arranged in a generally circular array around the space enclosed by the interior surface of the sealing element.

Embodiments of the present invention will now be described with reference to the accompanying drawings.

Figure 2:
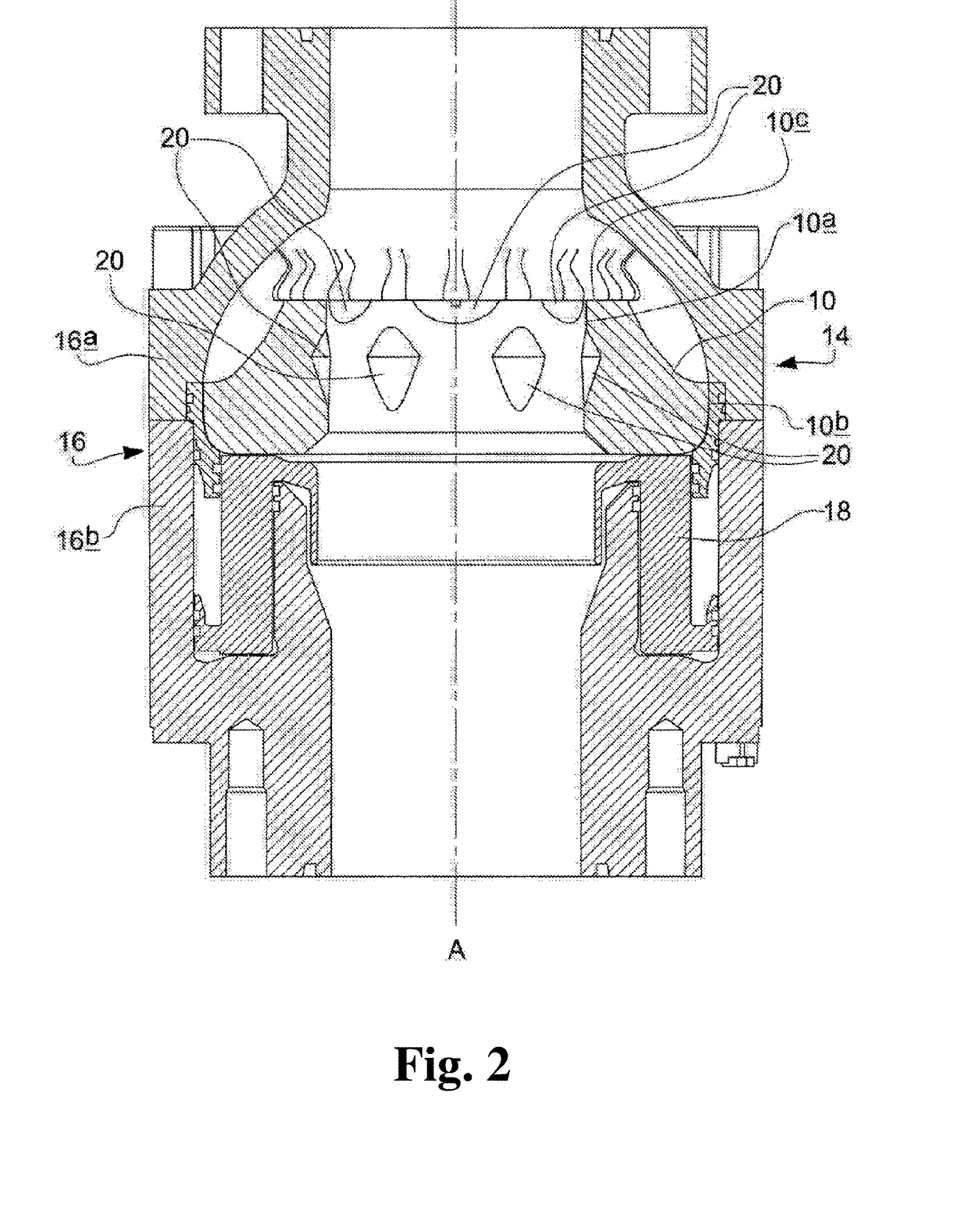
FIG. 2 is an illustration of a longitudinal cross section through a pressure containment device according to the present invention.
Figure 3:
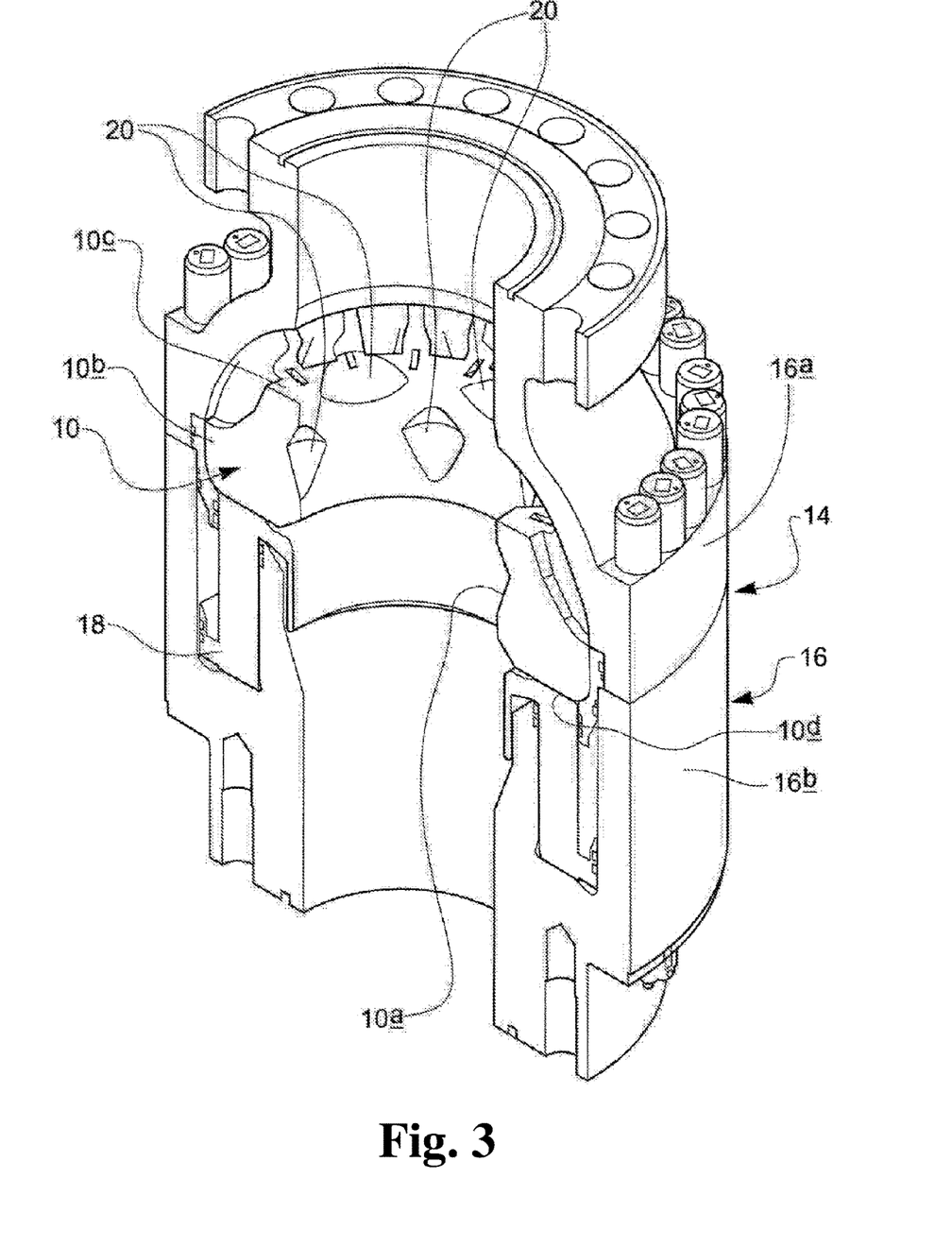
FIG. 3 is an isometric view of the longitudinal cross section through a pressure containment device illustrated in FIG. 2.

Referring now to FIGS. 2 and 3, there is shown a blowout preventer 14 having a housing 16 in which is located a sealing element 10 and an actuator assembly 18. The sealing element 10 has a longitudinal axis A and a cross-section perpendicular to its longitudinal axis A which is generally annular. The sealing element 10 thus has a radially inwardly facing interior surface 10a, a radially outwardly facing exterior surface 10b, and a first end surface 10c and a second end surface 10d which extend from the radially inwardly facing interior surface 10a to the radially outwardly facing exterior surface 10b, at opposite ends of the sealing element 10. Both the radially inwardly facing interior surface 10a and the first end surface 10c are provided with a plurality of discrete recesses 20.

In this example, the end surfaces 10c, 10d of the sealing element 10 extend generally perpendicular to the radially inwardly facing interior surface 10a.

The actuator assembly 18 is operable to engage with the sealing element 10 to reduce the diameter of the space enclosed by its radially inwardly facing interior surface 10a.

In one embodiment, the actuator assembly 18 is operable to push the sealing element 10 against the housing 16 to reduce the diameter of the space enclosed by the radially inwardly facing interior surface 10a.

In the example illustrated in FIGS. 2 and 3, the actuator assembly 18 comprises a piston movable by the supply of pressurized fluid to the pressure containment device. In this embodiment, the piston is movable generally parallel to a longitudinal axis A by the supply of pressurized fluid to an activation chamber provided in the housing 16 of the pressure containment device.

In one embodiment, the housing 16 is provided in two parts 16a, 16b, the first part 16a having a curved interior surface which is intended to engage with the sealing element 10 and to cause the sealing element 10 to constrict when the sealing element 10 is pushed against the housing 16 by the actuator assembly 18.

It should be appreciated, however, that the present invention is not restricted to this type of actuator assembly 18. The actuator assembly may, for example, comprise a ram/piston or plurality of rams/pistons which is/are movable perpendicular to the longitudinal axis A and radially inwardly of the sealing element 10. Alternatively, the actuator assembly 18 may comprise a supply of pressurized fluid and means to direct the pressurized fluid to act directly on the radially outwardly facing exterior surface 10b of the sealing element 10 to compress the sealing element 10 and thus reduce the diameter of the space enclosed by the radially inwardly facing interior surface 10a.

Figure 4:
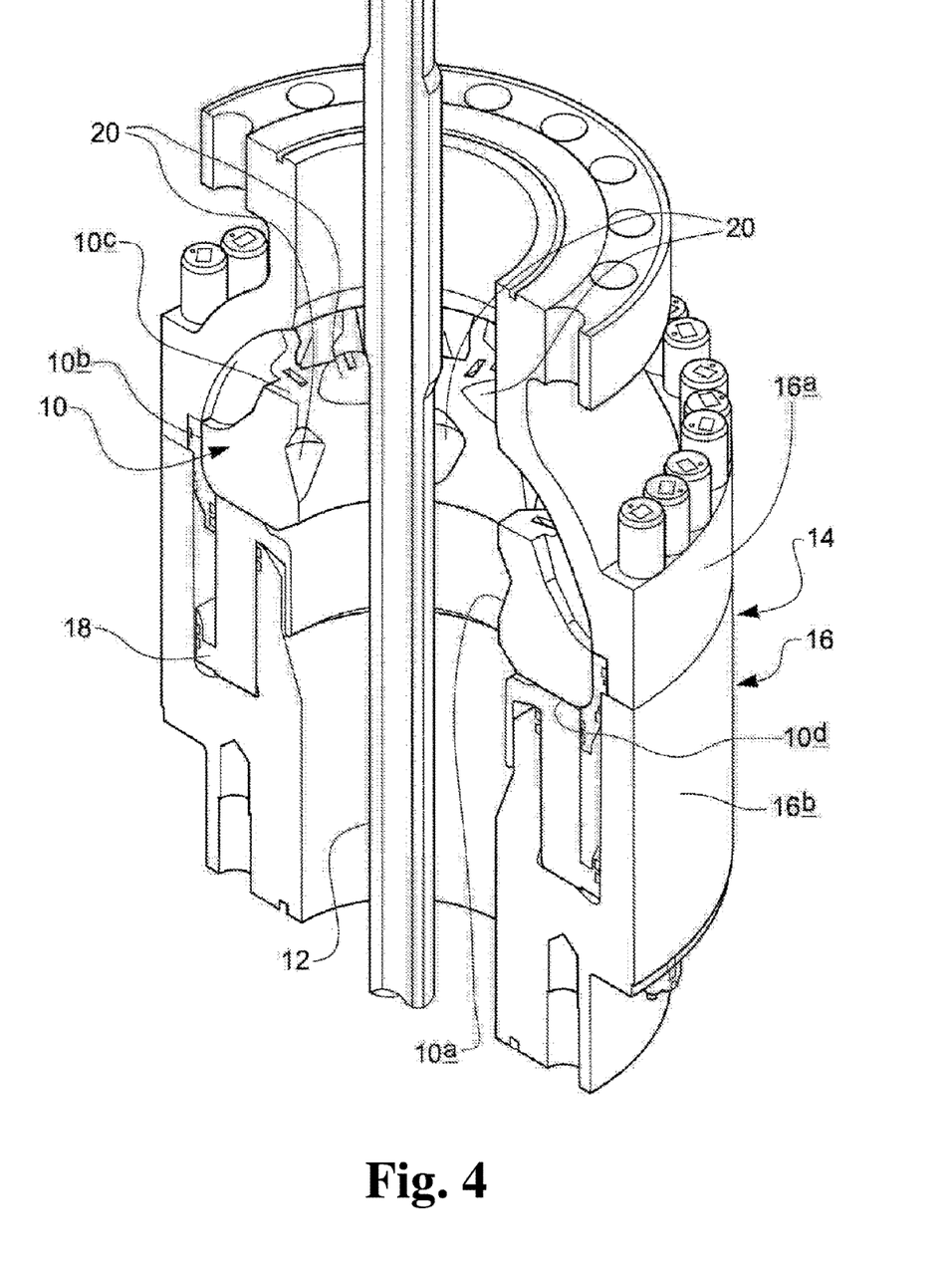
FIG. 4 is an isometric view of the longitudinal cross section through a pressure containment device illustrated in FIG. 2 with a portion of a drill string extending through the pressure containment device.

FIG. 4 shows a tubular drill string 12 extending through the blowout preventer 14. In this example, the tubular drill string 12 extends along the longitudinal axis A of the sealing element 10.

Figure 5:
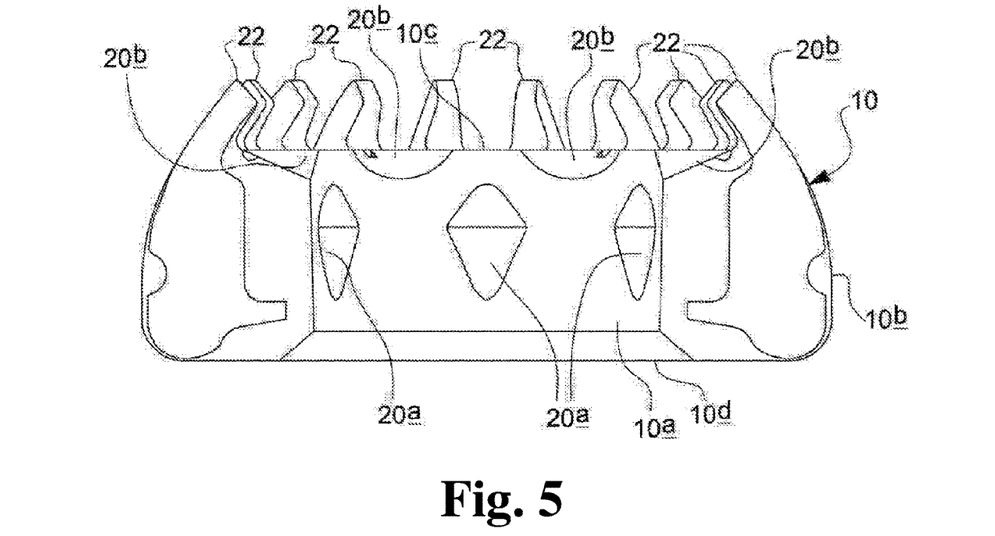
FIG. 5 is an illustration of a longitudinal cross-section through the sealing element of the pressure containment device illustrated in FIGS. 2 and 3.
Figure 6:
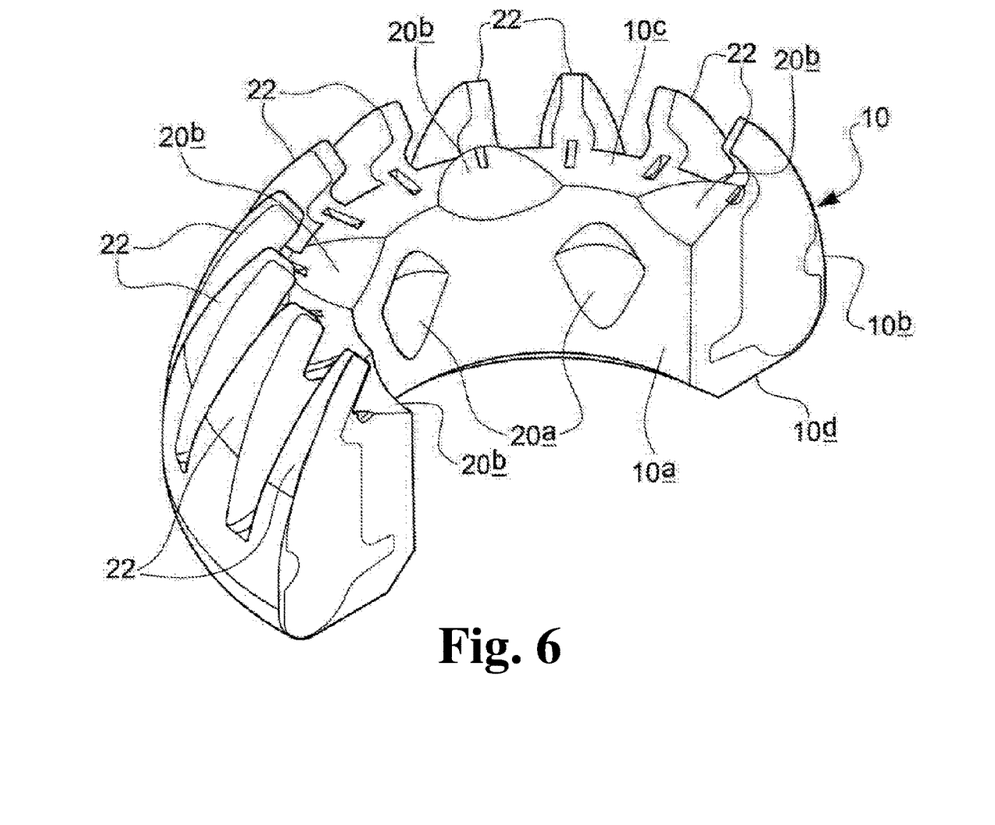
FIG. 6 is an isometric view of the longitudinal cross-section through the sealing element illustrated in FIG. 5.

The sealing element 10 is illustrated in more detail in FIGS. 5 and 6.

The recesses 20 provided in the radially inwardly facing interior surface 10a form a first set of recesses 20a in which the recesses 20 are located exclusively in the radially inwardly facing interior surface 10a between the first end surface 10c and the second end surface 10d, spaced around the circumference of the radially inwardly facing interior surface 10a. In this example, the recesses in the first set of recesses 20a are located generally centrally between the first end surface 10c and the second end surface 10d, and are regularly spaced around the circumference of the radially inwardly facing interior surface 10a.

The recesses 20 provided in the end surface 10c form a second set of recesses 20b in which the recesses 20 are spaced in a generally circular array. In this example, the recesses 20 in the second set of recesses 20b are regularly spaced in a generally circular array.

In this example, each set of recesses 20a, 20b has 6 recesses 20.

In this example, the recesses 20 in the second set of recesses 20b are located at the interface between the end surface 10c and the radially inwardly facing interior surface 10a.

The center of each of the recesses 20 is located on an imaginary plane in which the longitudinal axis A of the sealing element 10 also lies, and in this example, the imaginary plane associated with each recess 20 in the first set of recesses 20a is located directly between two of the imaginary planes associated with recesses 20 of the second set of recesses 20b, whilst the imaginary plane associated with each recess 20 in the second set of recesses 20b is located directly between two of the imaginary planes associated with the recesses 20 of the first set of recesses 20a In other words, when viewed from a direction generally parallel to the longitudinal axis A, each recess 20 in the first set of recesses 20a is located between two recesses 20 from the second set of recesses 20b and vice versa.

In this case, the angle between adjacent imaginary planes is substantially equal for all pairs of adjacent imaginary planes.

The sealing element 10 may be made predominantly from an elastomer such as hydrogenated nitrile butadiene rubber (HNBR), nitrile rubber (NBR), polyurethanes or a combination thereof. Rubbers and elastomers having a durometer range between 50 Shore A and 100 Shore A may be used. Composite materials which include elastomers, polymers and fiber-reinforced elastomers or fluorocarbons may also be used. The elastomeric material may further be modified by the addition of friction reducers.

In this example, the sealing element includes a plurality of rigid inserts 22. These can, for example, be metallic.

In this example, the rigid inserts 22 are regularly spaced from one another and arranged in a generally circular array around the space enclosed by the radially inwardly facing interior surface 10a of the sealing element 10.

Figure 7A:
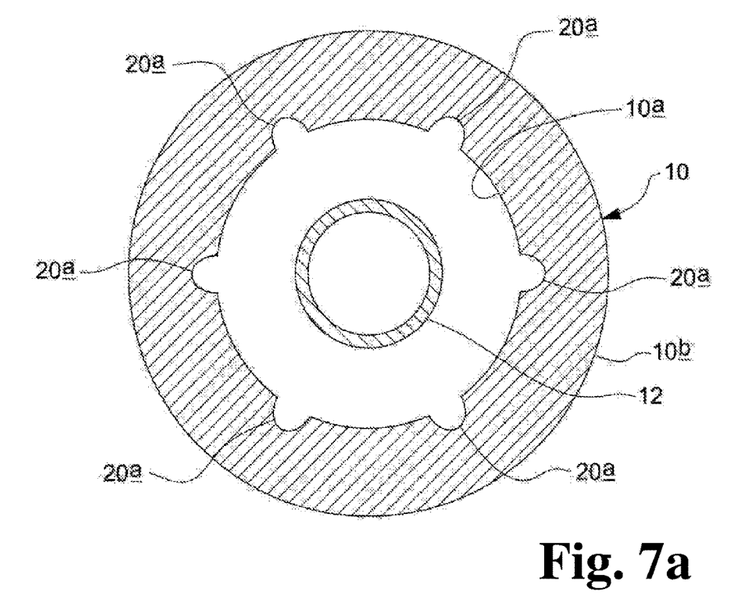
Figure 7B:
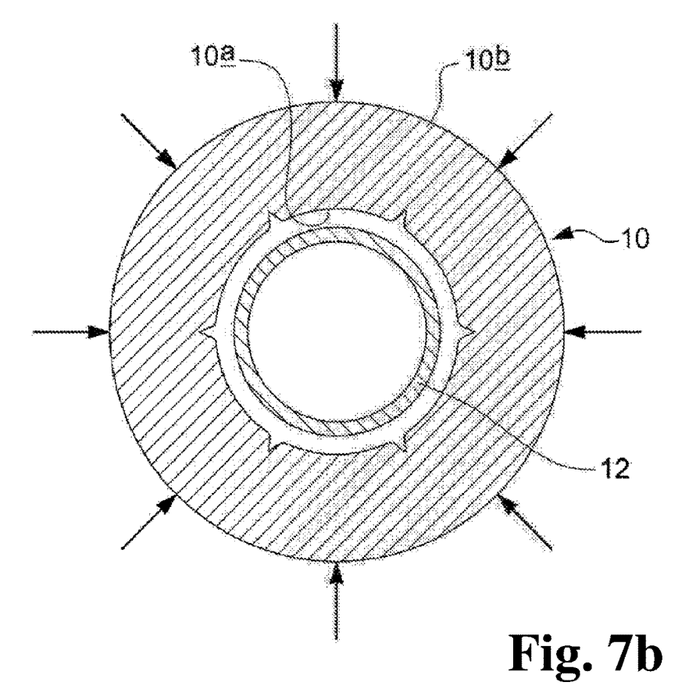

A transverse cross-section (in a plane perpendicular to the longitudinal axis A) through the sealing element 10 and associated tubular drill string 12 is illustrated schematically in FIGS. 7a and 7b. FIG. 7a shows the sealing element 10 in its undeformed, relaxed, state in which the radially inwardly facing interior surface 10a of the sealing element 10 is spaced from the tubular drill string 12. FIG. 7b shows the sealing element 10 in its deformed state in which the actuator assembly 18 has acted on the sealing element 10 to cause it to constrict about the tubular drill string 12.

As mentioned earlier in relation to prior art blowout preventers, the deformation/folding pattern on the elastomeric material on the sealing element 10 depends on either the buckling modes or the defects/weak regions of the elastomer ring. The recesses 20 at the inner surface regions provide the least resistance for material folding, and hence the material will fold at each recess 20. As a result, the folding pattern will be more regular at the inner surface of the elastomer as shown in FIG. 7b. These regular folds create the same level of strain in all the folds. This may increase the life of the elastomeric component of the sealing element 10 due to the reduction in the available strain energy density at the critical folding regions. This regular folding pattern distributes the sealing surface evenly around the circumference of the tubular drill string 12, and the radial compressive force required to seal around the tubular drill string 12 may be reduced.

The exact shape of the recesses 20 may be varied. Alternative embodiments of sealing elements 10 are illustrated in FIGS. 8, 9, 10 and 11. In the example illustrated in FIGS. 8 and 9, the recesses 20 are generally elliptical with the recesses 20 in the first set of recesses 20a have the shape of roughly half of an ellipsoid (cut longitudinally), whilst the recesses 20 in the second set of recesses 20b have the shape of roughly one quarter of an ellipsoid. In the example illustrated in FIGS. 10 and 11, the recesses 20 in the first set 20a of recesses have the shape of a longitudinal cross-section through a cylinder, whilst the recesses 20 in the second set of recesses 20b have the shape of a portion of an ovoid. The recesses 20 in the second set of recesses 20b could, of course, have the shape of a quarter of a cylinder.

Figure 8:
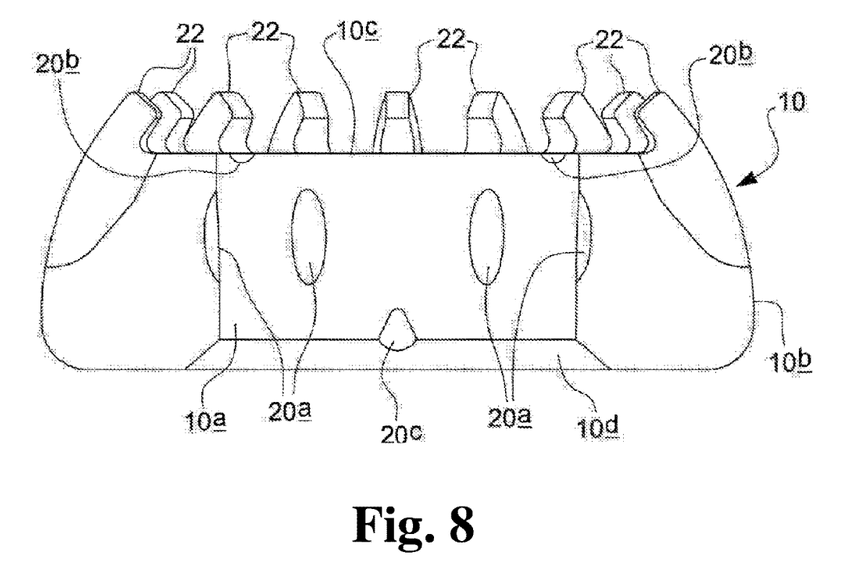
FIG. 8 is an illustration of a longitudinal cross-section through an embodiment of sealing element.
Figure 9:
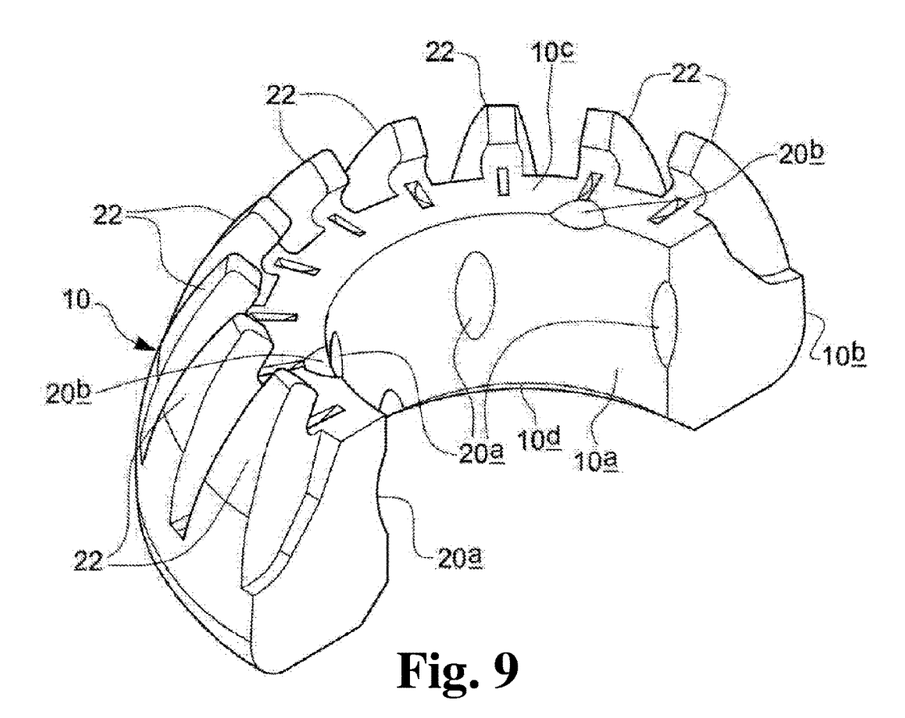
FIG. 9 is an isometric view of the longitudinal cross-section through the sealing element illustrated in FIG. 8.
Figure 10:
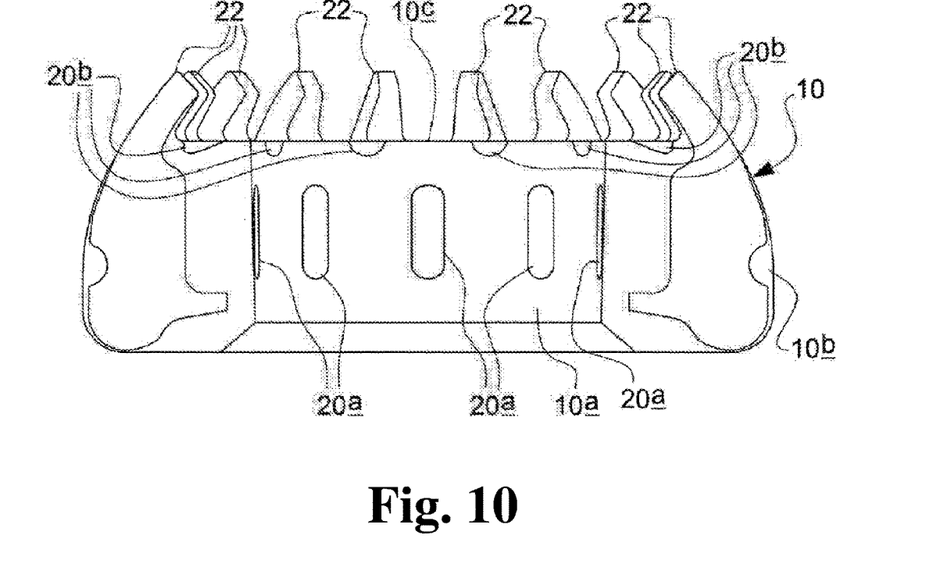
FIG. 10 is an illustration of a longitudinal cross-section through an embodiment of the sealing element.
Figure 11:
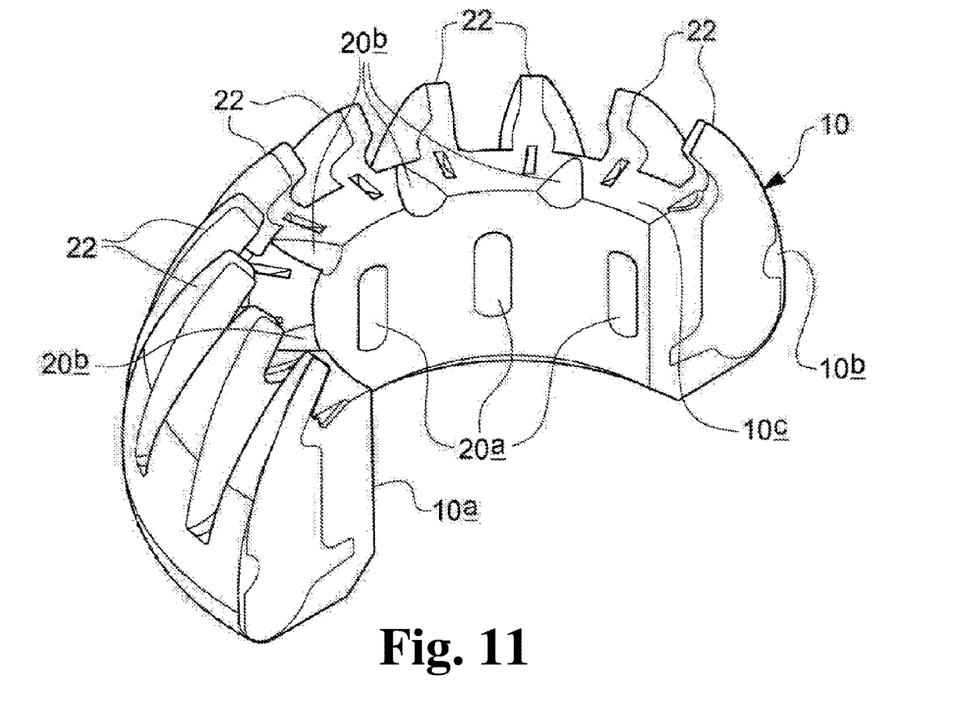
FIG. 11 is an isometric view of the longitudinal cross-section through the sealing element illustrated in FIG. 10.

Whilst in the examples described above, it is specified that recesses 20 are provided only the radially inwardly facing interior surface 10a and the radially outwardly facing end surface 10b of the sealing element 10, it should be appreciated that the sealing element 10 has a second end surface 10d which also extends between the radially inwardly facing interior surface 10a and the radially outwardly facing exterior surface 10b at an opposite end of the sealing element 10 to the first end surface 10c. A third set of recesses 20c may also be provided in this second end surface 10d as illustrated in FIGS. 8 and 9. In this example, the recesses 20 in the second set of recesses 20b and the third set of recesses 20c are arranged such that on each imaginary plane (containing the longitudinal axis A) associated with a recess 20 in either of the end surfaces 10c, 10d there is either a recess 20 in the second set of recesses 20b or a recess 20 in the third set of recesses 20c, not both. Also in this example, the recesses 20 in the second set of recesses 20b and the third set of recesses 20c alternate moving around the longitudinal axis A of the sealing element 10. It should be appreciated, however, that this need not be the case, and recesses 20 in both the second set of recesses 20b and the third set of recesses 20c may be provided in the same imaginary plane.

The exact location, number, size, pattern of distribution (regular/irregular), number of sets in each surface and shape of the recesses 20 may, of course, be varied to achieve a desired folding pattern. The exact location, number, size and shape of the recesses 20 required will depend on the mechanical properties of the elastomeric material from which the sealing element 10 is made, the absence/presence of rigid inserts 22 and their number, the dimensions of the sealing element 10, the actuation mechanism, and the degree of constriction required.

At least 3 recesses can, for example, be provided in each set.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilized for realizing the present invention in diverse forms thereof. The present invention is not limited to embodiments described herein; reference should be had to the appended claims.

What is claimed is:

1. A pressure containment device comprising:
   a sealing element comprising:
      a longitudinal axis;
      a cross-section arranged perpendicular to the longitudinal axis, the cross-section being configured to be substantially annular;
      a radially inwardly facing interior surface comprising a plurality of recesses, which plurality of recesses are arranged to form a first set of recesses in which the plurality of recesses are spaced around a circumference of the radially inwardly facing interior surface;
      a radially outwardly facing exterior surface;
      a first end surface comprising a plurality of recesses, which plurality of recesses are arranged to form a second set of recesses in which the plurality of recesses are spaced in an array which is substantially circular; and
      a second end surface,
   wherein,
      the first end surface and the second end surface are each arranged to extend from the radially inwardly facing interior surface to the radially outwardly facing exterior surface,
      the first end surface and the second end surface are arranged at opposite ends of the sealing element,
      each of the recesses comprises a center,
      the center of each of the recesses is arranged on a respective imaginary plane in which the longitudinal axis of the sealing element is also arranged, and
      the imaginary plane associated with each recess in the second set of recesses is located directly between two of the imaginary planes associated with recesses of the first set of recesses.

2. The pressure containment device as recited in claim 1, wherein the recesses of the first set of recesses are arranged exclusively in the radially inwardly facing interior surface between the first end surface and the second end surface.

3. The pressure containment device as recited in claim 2, wherein the recesses of the first set of recesses are arranged substantially centrally between the first end surface and the second end surface.

4. The pressure containment device as recited in claim 3, wherein the recesses of the first set of recesses are arranged so as to be regularly spaced around the circumference of the radially inwardly facing interior surface.

5. The pressure containment device as recited in claim 1, wherein the recesses of the second set of recesses are arranged so as to be regularly spaced in the array.

6. The pressure containment device as recited in claim 1, wherein the imaginary plane associated with each recess in the second set of recesses is located centrally between two of the imaginary planes associated with recesses of the first set of recesses.

7. The pressure containment device as recited in claim 1, wherein an angle between adjacent imaginary planes is substantially equal for all pairs of adjacent imaginary planes.

8. The pressure containment device as recited in claim 1, further comprising:
   an actuator assembly which is configured to engage with the sealing element so as to reduce a diameter of a space enclosed by the radially inwardly facing interior surface.

9. The pressure containment device as recited in claim 8, further comprising:
   a housing,
   wherein, the actuator assembly is further configured to push the sealing element against the housing so as to reduce the diameter of the space enclosed by the radially inwardly facing interior surface.

10. The pressure containment device as recited in claim 8, wherein the actuator assembly comprises a piston which is configured to be moved by a supply of a pressurized fluid to the pressure containment device.

11. The pressure containment device as recited in claim 10, wherein the piston is configured to be moved substantially parallel to the longitudinal axis of the pressure containment device by the supply of the pressurized fluid to the pressure containment device.

12. The pressure containment device as recited in claim 1, wherein the sealing element is predominantly made from an elastomer.

13. The pressure containment device as recited in claim 1, wherein the sealing element further includes a plurality of rigid inserts.

14. The pressure containment device as recited in claim 13, wherein the plurality of rigid inserts are arranged so as to be spaced apart from one another in an array which is substantially circular around a space enclosed by the radially inwardly facing interior surface of the sealing element.

\* \* \* \* \*